(12) United States Patent
Hardwicke et al.

(10) Patent No.: US 8,510,060 B2
(45) Date of Patent: Aug. 13, 2013

(54) LIFE MANAGEMENT SYSTEM AND METHOD FOR GAS TURBINE THERMAL BARRIER COATINGS

(75) Inventors: Canan Uslu Hardwicke, Greenville, SC (US); Subrat Nanda, Greenville, SC (US); Achalesh Kumar Pandey, Greenville, SC (US); Sameer Vittal, Atlanta, GA (US); Jagmeet Singh, Greenville, SC (US)

(73) Assignee: General Electric Company, Schenectady, NY (US)

( * ) Notice: Subject to any disclaimer, the term of this patent is extended or adjusted under 35 U.S.C. 154(b) by 281 days.

(21) Appl. No.: 12/795,089

(22) Filed: Jun. 7, 2010

(65) Prior Publication Data

US 2011/0296810 A1 Dec. 8, 2011

(51) Int. Cl.
*G01N 37/00* (2006.01)

(52) U.S. Cl.
USPC .......................... 702/34; 702/113; 60/39.091

(58) Field of Classification Search
USPC .............................. 702/34, 113; 60/39.091
See application file for complete search history.

(56) References Cited

U.S. PATENT DOCUMENTS

| | | | |
|---|---|---|---|
| 5,455,777 A | | 10/1995 | Fujiyama et al. |
| 6,226,597 B1 * | | 5/2001 | Eastman et al. ................ 702/34 |
| 6,636,813 B1 * | | 10/2003 | Isobe et al. ...................... 702/34 |
| 6,813,749 B2 | | 11/2004 | Rassaian |
| 7,016,825 B1 | | 3/2006 | Tryon, III |
| 7,243,042 B2 | | 7/2007 | Plotts et al. |
| 7,333,918 B2 * | | 2/2008 | Burrill et al. .................. 702/184 |
| 7,376,518 B2 | | 5/2008 | Subramanian et al. |
| 7,535,565 B1 * | | 5/2009 | Viertl et al. .................... 356/318 |
| 7,740,948 B1 * | | 6/2010 | Alvin ............................. 428/469 |
| 2006/0116847 A1 * | | 6/2006 | Plotts et al. ..................... 702/136 |
| 2006/0265183 A1 * | | 11/2006 | Jacques et al. ................ 702/181 |
| 2009/0312956 A1 * | | 12/2009 | Zombo et al. ................... 702/34 |
| 2011/0137575 A1 * | | 6/2011 | Koul ............................... 702/34 |

FOREIGN PATENT DOCUMENTS

| | | |
|---|---|---|
| JP | 2001317369 A | 11/2001 |
| JP | 2003106166 A | 4/2003 |
| WO | 2007013870 A2 | 2/2007 |

OTHER PUBLICATIONS

D.N. Mavris et al., "Assessment of Uncertainty in Aerospace Propulsion System Design and Simulation", Presented at the 2003 JANNAF Joint Meeting Dec. 1-5, 2003, pp. 1-10 http://smartech.gatech.edu/xmlui/handle/1853/6421 http://smartech.gatech.edu/xmlui/bitstream/handle/1853/6421/JANNAF03_final_manuscript.pdf?sequence=1.*

M. Kemppainen, J. Scheibel and R. Viswanathan, "Combustion Turbine Hot Section Life Management", OMMI, Aug. 2002, vol. 1, Issue 2.

* cited by examiner

*Primary Examiner* — Sujoy Kundu
*Assistant Examiner* — Regis Betsch
(74) *Attorney, Agent, or Firm* — McNees Wallace & Nurick LLC

(57) ABSTRACT

A method, system and computer program product for life management and monitoring of a high temperature gas turbine including components having a thermal barrier coating is disclosed. The method, system and computer program product uses design, monitoring and diagnostics, and inspection data to determine the cumulative damage and remaining useful life of gas turbine components and unit risk and classification probability to determine thermal barrier coating damage probability, remaining useful life, and inspection recommendations.

18 Claims, 2 Drawing Sheets

LIFE MANAGEMENT SYSTEM AND METHOD FOR GAS TURBINE THERMAL BARRIER COATINGS

FIELD OF THE INVENTION

The present disclosure is generally directed to gas turbines, and more particularly directed to a life management system, method and computer product to estimate thermal barrier coating performance of turbine hot gas and combustion components.

BACKGROUND OF THE INVENTION

Gas turbine engines include a compressor section for supplying a flow of compressed combustion air, a combustor section for burning fuel in the compressed combustion air, and a turbine section for extracting thermal energy from the combustion air and converting that energy into mechanical energy in the form of a rotating shaft.

Modern high efficiency combustion turbines have firing temperatures that exceed about 1,000° C., and even higher firing temperatures are expected as the demand for more efficient engines continues. Many components that form the "hot gas path" combustor and turbine sections are directly exposed to aggressive hot combustion gasses, for example, the combustor liner, the transition duct between the combustion and turbine sections, and the turbine stationary vanes and rotating blades and surrounding ring segments. In addition to thermal stresses, these and other components are also exposed to mechanical stresses and loads that further wear on the components.

Many of the cobalt and nickel based superalloy materials traditionally used to fabricate the majority of combustion turbine components used in the hot gas path section of the combustion turbine engine are insulated from the hot gas flow by coating the components with a thermal barrier coating (TBC) in order to survive long term operation in this aggressive high temperature combustion environment.

TBCs are highly advanced material systems. These coatings serve to insulate the components from large and prolonged heat loads by utilizing thermally insulating materials which can sustain an appreciable temperature difference between the load bearing alloys and the coating surface. In doing so, these coatings can allow for higher operating temperatures while limiting the thermal exposure of structural components, extending component life by reducing oxidation and thermal fatigue.

TBC systems often consist of four layers: the metal substrate, metallic bond coat, thermally grown oxide, and ceramic topcoat. The ceramic topcoat is typically composed of yttria-stabilized zirconia (YSZ), which is desirable for having very low thermal conductivity while remaining stable at nominal operating temperatures typically seen in applications. TBCs fail (or spill) through various degradation modes that include mechanical rumpling of bond coat during thermal cyclic exposure, accelerated oxidation, hot corrosion, and molten deposit degradation. With the loss of the TBC, the component experiences much higher temperatures and the component life is reduced dramatically.

Considering above factors into account, a fixed schedule may be used to inspect these critical components. It is important to schedule the inspection of these critical components as close to the predicted failure of the components to minimize the time the turbine is taken off-line for inspection. In order to reduce the operational costs, it is important to improve the accuracy of evaluation of remaining life of these parts, including having an accurate estimation of the residual life of thermal barrier coatings upon these parts in order to schedule inspection and/or the repair. Accordingly, there is a need to have the ability to accurately estimate thermal barrier coating performance.

BRIEF DESCRIPTION OF THE INVENTION

In an exemplary embodiment, a life management system for a gas turbine unit is disclosed. The life management system includes a means for determining a cumulative damage of at least one component, a means for determining a gas turbine unit risk and a classification probability, and a data fusion module that receives the cumulative damage of the at least one component and the gas turbine unit risk and classification probability, the data fusion module configured to calculate at least one life parameter.

In another exemplary embodiment, a method for determining a component life parameter of a component of a gas turbine is disclosed. The method includes determining a cumulative damage of at least one component, determining a gas turbine unit risk and classification probability, and providing the cumulative damage, the gas turbine unit risk and classification probability to a data fusion module configured to calculate the life parameter.

In yet another exemplary embodiment, a computer program product is disclosed. The computer program product includes a machine-readable medium storing instructions operable to cause one or more machines to perform operations. The operations include determining a cumulative damage of a gas turbine component determining a gas turbine unit risk and classification probability, and using the cumulative damage and gas turbine unit risk and classification probability to calculate a life parameter.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION OF THE INVENTION

Embodiments of the present disclosure provide a method, system and computer program product for life management and monitoring of a gas turbine. The method, system and computer program product includes predicting the remaining useful life of thermal barrier coatings (TBCs) of turbine hot gas and combustion components of the gas turbine. The method, system and computer program product uses design, monitoring and diagnostics, and inspection data to determine the cumulative damage and remaining useful life of a gas turbine components having TBCs.

One advantage of the present disclosure is to provide an accurate gas turbine inspection scheduling tool that is an improvement compared to fixed schedule interval inspection.

Another advantage of the present disclosure is to provide an accurate prediction of TBC damage based on current and future risk based prediction.

One advantage of the present disclosure is to provide an improved life prediction of thermal barrier coatings on high temperature components that may be used to determine inspection scheduling.

Another advantage of the present disclosure is to provide an improved risk assessment of a gas turbine including components having thermal barrier coatings.

Figure 1:
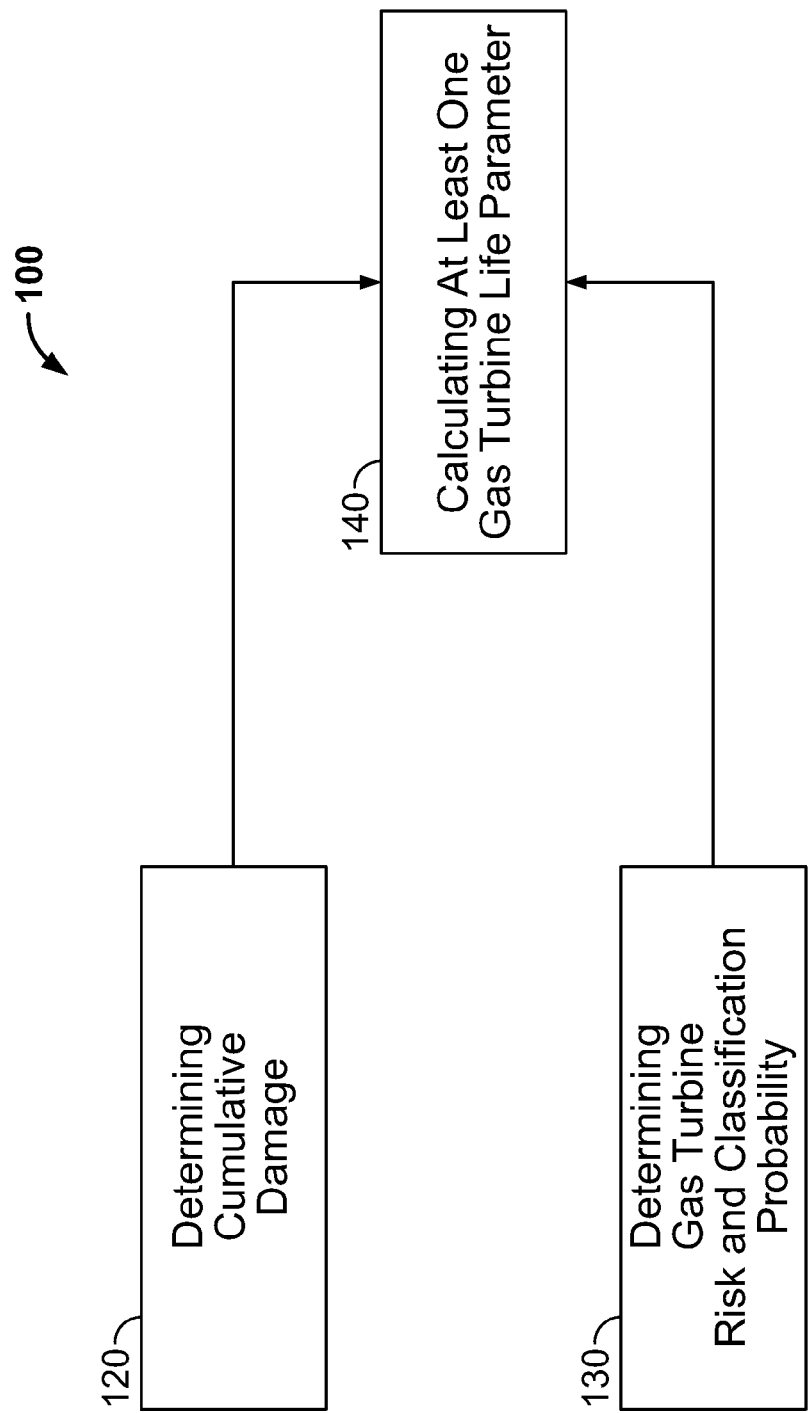
FIG. 1 is a flow chart of an embodiment of a method for determining a thermal barrier coated component life parameter according to the disclosure.

FIG. 1 is a flow diagram of one example of a life management system 100 for a gas turbine as performed by a method, system and computer program product of one embodiment of the present disclosure. The life management system 100 includes a first step 120 that provides for determining the cumulative damage of one or more gas turbine components, a second step 130 that provides for determining the unit risk and classification probability of a gas turbine unit, and a third step 140 that provides for calculating at least one life parameter from the first and second step 120, 130 determinations. The gas turbine component may have a TBC. For example, the component may be, but is not limited to, a combustor liner, a transition duct between the combustion and turbine sections, turbine stationary vanes and rotating blades, and surrounding ring segments. The life management system 100 may be applied and is valid for any damage mode for any component in the hot gas path.

Figure 2:
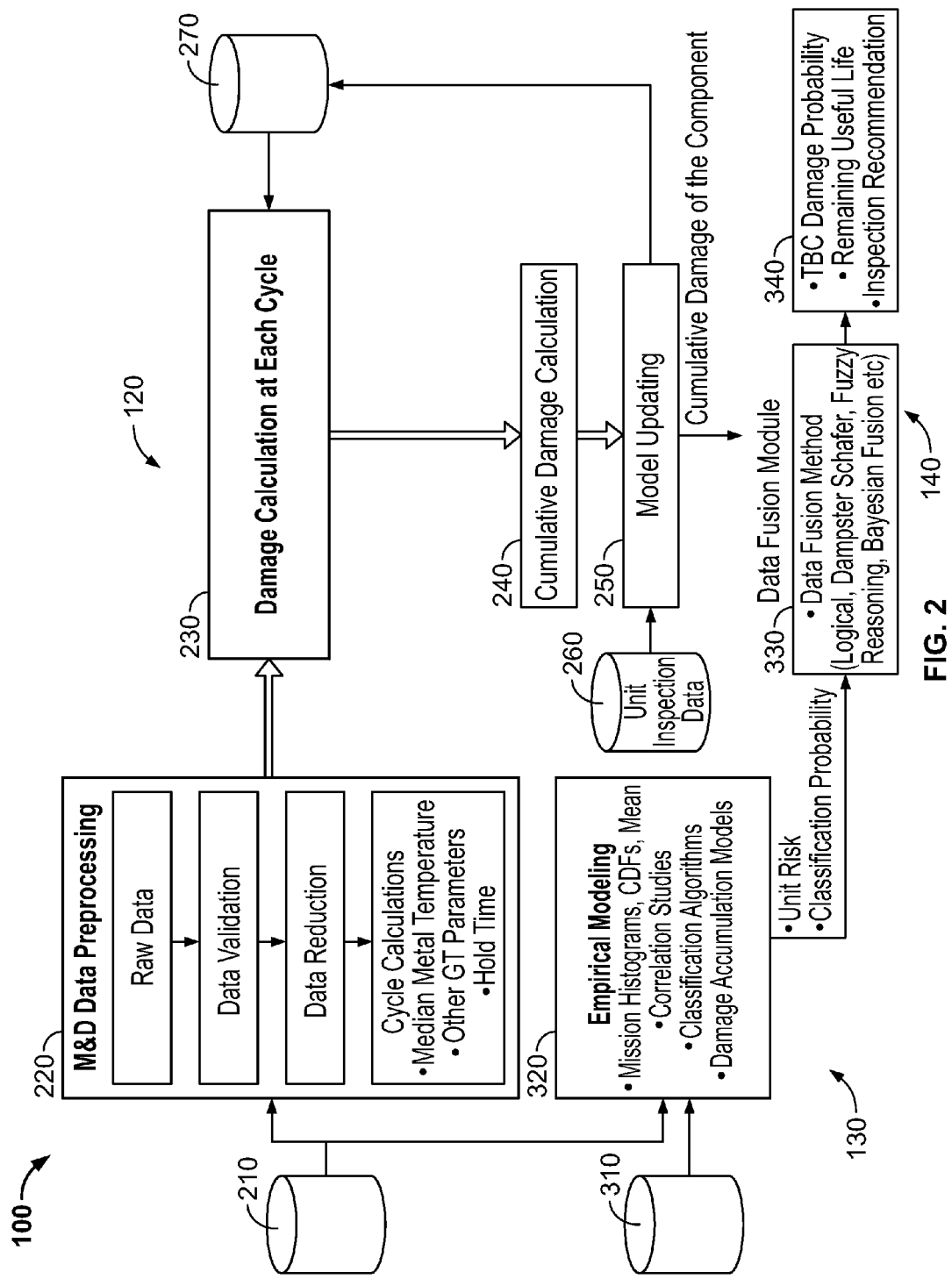
FIG. 2 is a flow chart of another embodiment of a method for determining a thermal barrier coated component life parameter according to the disclosure.

FIG. 2 is a more detailed flow diagram of the exemplary life management system 100. As can be seen in FIG. 2, the life management system 100 includes a first step 120 that provides for determining the cumulative damage of a component. The first step 120 includes a first cumulative damage sub-step 210. The first cumulative damage sub-step 210 includes providing monitoring and diagnostics (M&D) data for a gas turbine component. The first cumulative damage sub-step 210 may include a M&D database for storing M&D data. The M&D database includes operational parameters including, but not limited to, megawatts produced by GT, compressor discharge temperature, exhaust temperature, various pressure ratios in GT, temperatures at various points in GT, rotating speed of the shaft, inlet pressure, site ambient conditions, firing temperature, inlet guide vane angle, compressor inlet temperature.

The first step 120 further includes a second cumulative damage sub-step 220 for calculating component cycle parameters. The second cumulative damage sub-step 220 includes a M&D preprocessing means for calculating component cycle parameters. The component cycle parameters may include component median or direct metal temperatures, the location of median, mean or direct metal temperatures, hold time and turbine load. Metal temperature is calculated analytically using physics based models and gas turbine measured parameters, e.g., IGV angle, compressor discharge temperature, turbine load, etc. This metal temperature value can also be measured if a metal temperature measurement sensor is available in the gas turbine. The component cycle parameters may further include, but are not limited to, other mean or median values of inlet guide vane angle, compressor discharge temperature, and firing temperature. The M&D preprocessing means may be an algorithm and/or computer program embedded upon a computer readable medium and associated computer system for the execution thereof.

Furthermore, preprocessing, processing, and calculating means as used in this disclosure generally refer to algorithm(s) and/or computer program(s) embedded upon a computer readable medium(s) and associated computer system(s) for the execution thereof. In addition, databases, as provided for in this disclosure, are kept and/or maintained on computer readable medium such as memory storage devices, such as, but limited to hard disk drives.

The first step 120 further includes a third cumulative damage sub-step 230 that provides for calculating damage at each cycle based upon damage transfer functions and information processed in step 220. This damage transfer function is developed based upon physics models and material properties of thermal barrier coating. Each component may have different transfer function based upon material type and hardware configuration. The third cumulative damage sub-step 230 includes a cycle damage calculation means for calculating damage of individual stage or individual components. In one embodiment, the third cumulative damage sub-step 230 includes a cycle damage calculation means for calculating damage of components including, but not limited to, stage-1 buckets and stage-1 nozzles. In one embodiment, the damage calculation at each cycle is performed by an appropriate algorithm.

The first step 120 further includes a fourth cumulative damage sub-step 240 that provides for calculating cumulative damage of a component. The fourth cumulative damage sub-step 240 includes a cumulative damage calculation means for calculating the cumulative damage of a component. The fourth cumulative damage sub-step 240 provides the calculated cumulative damage of the component to a fifth cumulative damage sub-step 250.

The first step 120 further includes a fifth cumulative damage sub-step 250. The fifth cumulative damage sub-step 250 provides for updating the cumulative damage calculation of the component whenever new inspection information is received from field or service shop. Damage model transfer function coefficients are updated based upon new inspection data. This step is used to calibrate the model time to time based upon actual field inspection information about condition of thermal barrier coating of various components. The fifth cumulative damage sub-step 250 receives a cumulative damage calculation from the fourth cumulative damage sub-step 240, and also receives unit inspection data from a sixth cumulative damage sub-step 260, which provides data from a unit inspection database containing physical condition information of thermal barrier coating from field or service shop inspections. The fifth cumulative damage sub-step 250 then updates a seventh cumulative damage sub-step 270, which provides material and design information, damage model transfer function coefficients, and a hardware configuration database, which then updates the third cumulative damage sub-step 230. The material and design information and hardware configuration database may include, but is not limited to, gas turbine component configuration information, e.g., stage-1 bucket hardware type, coating material information and damage transfer function coefficients.

In such a manner, the material and design information and hardware configuration database updates the damage calculation for each step as calculated by the third cumulative damage sub-step 230. The cumulative damage sub-steps 210, 220, 230, 240, iteratively calculate the cumulative damage of a component of the gas turbine. The fifth cumulative damage sub-step 250 thus iteratively updates the material and design information and hardware configuration database of the seventh cumulative damage sub-step 270 and calculates component cumulative damage.

As can be further seen in FIG. 2, the life management system 100 further includes a second step 130 of calculating a gas turbine unit risk and classification probability. The second step 130 includes a first life parameter sub-step 310 and a second life parameter sub-step 320. The first life parameter sub-step 310 includes providing reliability data for the gas turbine unit of interest. The reliability data includes, but is not limited to, fall out rate data, inspection data, operational hours data, start data and trips data, forced outage risk, damage accumulation models, part inspection, and operation and repair history. Reliability data is provided and stored in a reliability database.

Data from the reliability database and the M&D database provided for by the first cumulative damage sub-step 210 is provided to the second life parameter sub-step 320. The second life parameter sub-step 320 includes one or more empirical models for calculating gas turbine unit risk of fall out or of causing unplanned outage and classification probability used to classify unit as either being healthy or unhealthy from operational standpoint. The empirical models may include, but are not limited to, mission histograms, cumulative distribution functions (CDFs), correlation studies, classification algorithms, fallout models, unplanned models, cycle calculations, clustering algorithms, Bayesian classifiers, quadratic discriminant analysis and damage accumulation models.

As can yet be further seen in FIG. 2, the life management system 100 further includes a third step 140 that provides for calculating at least one life parameter. The third step 140 includes a first life parameter sub-step 330 that includes a data fusion method. The first life parameter sub-step 330 provides a data fusion module for executing the data fusion method to determine the at least one life parameter. The at least one life parameter may be a turbine component parameter or a turbine unit parameter. For example, the at least one life parameter may be, but is not limited to, a TBC damage probability of one or more components and/or the gas turbine unit, remaining useful life of the TBC of one or more components and/or the gas turbine unit, and an inspection recommendation for one or more components and/or the gas turbine unit. The data fusion module may include, but is not limited to, a data fusion methodology. The data fusion methodology may include a methodology including, but not limited to, a logic based method, a Dampster Schafer method, a Fuzzy Reasoning method, Artificial Intelligence, fusion of M&D data with damage accumulation, fallout and unplanned models and a Bayesian method.

The data fusion module receives unit risk and classification probability data from the one or more empirical models provided for in the second life parameter sub-step 320, as well as component cumulative damage from the fifth cumulative damage sub-step 250, and calculates the at least one life parameter. The at least one life parameter is provided to a second life parameter sub-step 340. The second life parameter sub-step 340 provides for displaying and/or storing the at least one life parameter.

The life management system 100 of the present disclosure, and in particular, the steps and sub-steps for determining the at least one life parameter are typically embodied by a computer program product that is executed by a processing element and stored by an associated memory device, both of which are commonly included in a computer or the like. As such the system of the present disclosure generally operates under control of this computer program product to provide the functionality described hereinabove in conjunction with the various components of the system, according to another aspect of the disclosure. The computer program product for performing the calculation of a thermal barrier coated component life parameter includes a computer-readable storage medium, and computer-readable program code portions, such as a series of computer instructions, embodied in the computer-readable storage medium.

In this regard, FIGS. 1 and 2 are block diagrams, flowcharts or other schematic representations of methods, systems and program products according to the disclosure. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means that implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions that execute on the computer or other programmable apparatus provide steps for implementing the functions specified in the flowchart(s) or step(s).

Accordingly, blocks or steps of the flowchart support combinations of means for performing the specified functions, combinations of steps for performing the specified functions, and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A life management system for predicting the remaining useful life of a thermal barrier coating (TBC) of turbine hot gas and combustion components of a gas turbine unit, comprising:

a non-transitory computer-readable storage medium comprising a series of computer instructions, for determining a cumulative damage of at least one component using operational data including temperature, the computer instructions comprising at least one damage transfer function based upon a physics model;

the computer-readable storage medium further configured for determining a gas turbine unit risk and a classification probability; and a data fusion module that receives the cumulative damage of the at least one component and the gas turbine unit risk and classification probability, the data fusion module configured to calculate at least one life parameter including a thermal barrier coating parameter;

wherein the at least one component comprises a thermal barrier coating.

2. The system of claim 1, wherein the at least one life parameter comprises a thermal barrier coating damage probability.

3. The system of claim 1, wherein the at least one life parameter comprises a remaining useful life prediction.

4. The system of claim 1, wherein the at least one component life parameter comprises an inspection recommendation.

5. The system of claim 1, wherein the computer-readable storage medium for determining the cumulative damage comprises a monitoring and diagnostics database, means for determining a median metal temperature, mean metal temperature or direct metal temperature and a temperature location, and a means for calculating damage of the at least one component for at least one cycle.

6. The system of claim 1, wherein the computer-readable storage medium for determining the gas turbine unit risk and classification probability comprise a reliability database.

7. The system of claim 1, wherein the data fusion module comprises a data fusion methodology selected from the group comprising a logic based method, a Dampster Schafer method, a Fuzzy Reasoning method, Artificial Intelligence, fusion of monitoring and diagnostics data with damage accumulation, fallout and unplanned models and a Bayesian method.

8. A method for determining a life parameter of a thermal barrier coating (TBC) of hot gas and combustion components of a gas turbine, comprising the steps of:
   providing a computer and a non-transitory computer-readable storage medium comprising a series of computer instructions executable by the computer, and a database on the storage medium for storing a monitoring and diagnostics (M&D) data for a gas turbine component;
   determining a cumulative damage of at least one component using operational data including temperature;
   determining a gas turbine unit risk and classification probability; and
   providing the cumulative damage, the gas turbine unit risk and classification probability to a data fusion module to generate a life parameter including a thermal barrier coating parameter;
   wherein the technical effect of performing the steps is to generate an inspection schedule;
   wherein determining a cumulative damage is based upon a physics model;
   and wherein the life parameter comprises a thermal barrier coating damage probability.

9. The method of claim 8, wherein the life parameter comprises a remaining useful life prediction of a thermal barrier coating.

10. The method of claim 8, wherein the life parameter comprises an inspection recommendation.

11. The method of claim 8, wherein determining the cumulative damage comprises analyzing monitoring and diagnostics data and unit inspection data.

12. The method of claim 8, wherein the computer-readable storage medium for determining the gas turbine unit risk and classification probability comprises a reliability database.

13. A computer program product comprising a non-transitory machine-readable medium storing instructions operable to cause one or more machines to perform operations comprising:
   determining a cumulative damage of a thermal barrier coating of a gas turbine component using operational data including temperature based on at least one damage transfer function, the damage transfer function comprising a physics model;
   determining a gas turbine unit risk and classification probability; and
   using the cumulative damage and gas turbine unit risk and classification probability to calculate a life parameter including a thermal barrier coating parameter;
   wherein the technical effect of performing the operations is to generate an inspection schedule.

14. The product of claim 13, wherein the life parameter comprises a thermal barrier coating damage probability.

15. The product of claim 13, wherein the life parameter comprises a remaining useful life prediction.

16. The product of claim 13, wherein the life parameter comprises an inspection recommendation.

17. The product of claim 13, wherein determining the cumulative damage comprises analyzing monitoring and diagnostics data to determine a median metal temperature, mean metal temperature or direct metal temperature and a temperature location, and calculating a damage for each cycle.

18. The product of claim 13, wherein the computer-readable storage medium for determining the gas turbine unit risk and classification probability comprises a reliability database.

* * * * *

UNITED STATES PATENT AND TRADEMARK OFFICE
CERTIFICATE OF CORRECTION

PATENT NO. : 8,510,060 B2  
APPLICATION NO. : 12/795089  
DATED : August 13, 2013  
INVENTOR(S) : Hardwicke et al.

Page 1 of 1

It is certified that error appears in the above-identified patent and that said Letters Patent is hereby corrected as shown below:

On the Title Page, in Item (56), under "OTHER PUBLICATIONS", in Column 2, Line 7, delete "J, Scheibel" and insert -- J. Scheibel --, therefor.

In the Specification

In Column 1, Line 55, delete "(or spill)" and insert -- (or spall) --, therefor.

Signed and Sealed this  
Fifth Day of November, 2013

Teresa Stanek Rea  
*Deputy Director of the United States Patent and Trademark Office*